United States Patent [19]
Seki et al.

[11] Patent Number: 4,966,110
[45] Date of Patent: Oct. 30, 1990

[54] INTAKE AIR FLOW CONTROL APPARATUS OF INTERNAL-COMBUSTION ENGINE

[75] Inventors: Yasunari Seki; Yuzuru Koike; Yosuke Tachibana; Kiyoshi Tsukimura, all of Saitama, Japan

[73] Assignee: Honda Giken Kogyo Kabushiki Kaisha, Tokyo, Japan

[21] Appl. No.: 429,844

[22] Filed: Oct. 31, 1989

[30] Foreign Application Priority Data

Oct. 31, 1988 [JP] Japan .................. 63-276912

[51] Int. Cl.$^5$ .......................................... F02M 23/06
[52] U.S. Cl. ...................................... 123/327; 123/321
[58] Field of Search ............... 123/320, 321, 322, 324, 123/327, 347, 348, 585, 587

[56] References Cited

U.S. PATENT DOCUMENTS

| | | | |
|---|---|---|---|
| 4,494,506 | 1/1985 | Hayama et al. | 123/322 X |
| 4,508,074 | 4/1985 | Yamato et al. | 123/327 |
| 4,649,877 | 3/1987 | Yasuoka et al. | 123/327 X |
| 4,700,674 | 10/1987 | Iwata | 123/327 |
| 4,700,679 | 10/1987 | Otobe et al. | 123/327 |
| 4,788,954 | 12/1988 | Otobe et al. | 123/327 |
| 4,848,284 | 7/1989 | Konno | 123/321 X |

FOREIGN PATENT DOCUMENTS

| | | | |
|---|---|---|---|
| 0197459 | 11/1983 | Japan | 123/327 |
| 0207871 | 9/1986 | Japan | 123/327 |

Primary Examiner—Willis R. Wolfe
Attorney, Agent, or Firm—Lyon & Lyon

[57] ABSTRACT

An intake air flow control apparatus for an internal-combustion engine, which includes a valve lift characteristic control means for variable control of the lift characteristics of intake and exhaust valves for the internal-combustion engine and a deceleration intake control means for controlling the quantity of intake air to be supplied to the downstream side of the intake throttle valve during the deceleration operation of the engine, comprises an intake control characteristic change means for changing the control characteristics of the deceleration intake control means in response to the valve lift characteristic control.

3 Claims, 8 Drawing Sheets

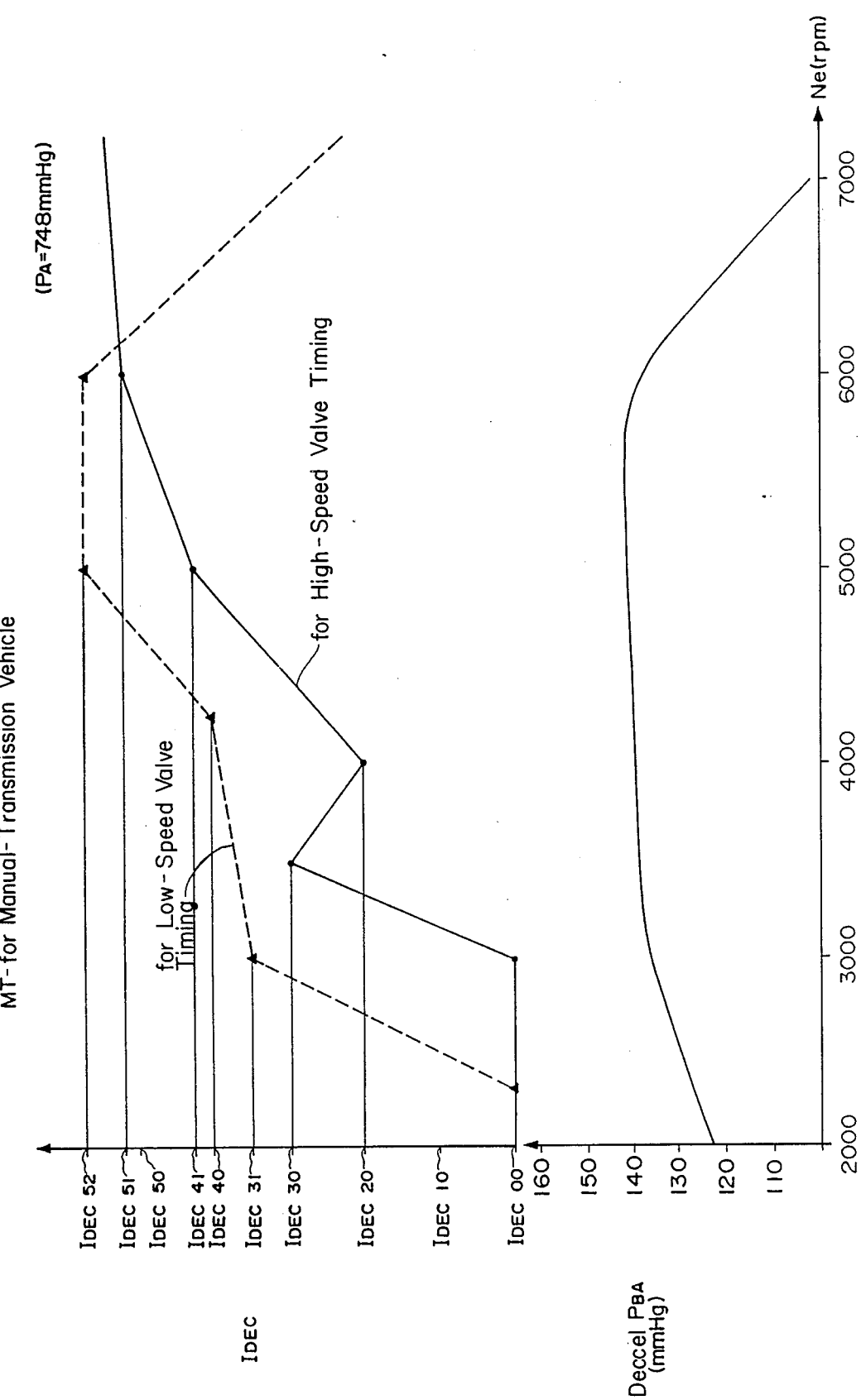

INTAKE AIR FLOW CONTROL APPARATUS OF INTERNAL-COMBUSTION ENGINE

BACKGROUND OF THE INVENTION

The present invention relates to an intake air flow control apparatus of internal-combustion engine and, more particularly, to an intake air flow control apparatus of internal-combustion engine which, during deceleration, controls the supply of a required quantity of intake air to an engine which is capable of changing intake or exhaust valve lift characteristics.

The engine, when in a state of deceleration and especially with the throttle valve fully-closed, is likely to be reversely driven by the wheels through a power transmission system, thereby decreasing the pressure in the intake pipe. With this pressure decrease, a negative pressure will be built up in the intake air passage at the downstream side of the throttle valve, allowing the lubricating oil in the oil pan of the engine to work up into a combustion chamber in a cylinder, and accordingly, as is well known, causing an adverse effect on oil consumption. In an internal-combustion engine having an improved piston ring structure or a decreased number of piston rings for the purpose of improving the dynamic characteristics and thermal efficiency of the engine, the improvement in the piston ring structure and the decrease in the number of the piston rings cause an increase the amount of lubricating oil entering the combustion chamber, resulting in a further increase in oil consumption.

To prevent such an increase in oil consumption, there has been suggested in Laid-Open Japanese Patent Publication No. 61-27243 an intake air flow control apparatus for controlling the quantity of intake air preset for each engine speed and being supplied to the downstream side of the throttle valve during the period of engine deceleration for the purpose of increasing the absolute pressure in the intake pipe.

However, this intake air flow control means is inadequate to prevent the oil from working up into the combustion area in the case of a vehicle provided with a so-called variable valve timing mechanism which is capable of changing the intake or exhaust valve lift characteristics of the engine. That is, the variable valve timing mechanism is designed to automatically vary the valve timing to a low-speed valve timing for operation in low- and medium-speed ranges and to a high-speed valve timing for operation in a high-speed range, thereby ensuring the production of a high power throughout a wide range from low to high speeds without decreasing the power in the low-speed range. The applicant of the present invention has previously proposed a valve timing change control (a patent applied for Apr. 1, 1988) for engines capable of changing the valve timing of at least one of the intake valve and the exhaust valve to a low-speed valve timing (Low-speed V/T) suitable for a low-speed range and to a high-speed valve timing (High-speed V/T) suitable for high-speed range. In this engine, the valve timing change control is adapted to change the valve timing at the time two values, read according to an engine operating condition, nearly coincide with each other, from a basic fuel quantity map for low-speed V/T set in accordance with a low-speed V/T and a basic fuel quantity map for high-speed V/T set in accordance with a high-speed V/T, and to determine the quantity of fuel to be supplied to the engine on the basis of the basic fuel quantity for high-speed V/T when a high-speed V/T is demanded and also on the basis of the basic fuel quantity for low-speed V/T when a low-speed V/T is demanded.

In a motor vehicle provided with an engine having such a variable valve timing mechanism, the engine is subjected to a change in pumping efficiency with the change of the valve timing, and accordingly the negative pressure produced during deceleration and the engine speed characteristics also vary, thus changing the amount of intake air required for maintaining a nearly constant absolute pressure in the intake pipe during deceleration.

SUMMARY OF THE INVENTION

This invention has been accomplished in an attempt to solve the above-mentioned problem, and has as its object the provision of an intake air flow control apparatus for internal-combustion engines that is designed to keep the oil from working up into the combustion chamber during deceleration, thereby preventing the increase in oil consumption even when the variable control of engine intake and exhaust valve lift characteristics is effected.

To attain the above-described object, the intake air flow control apparatus of this invention, which includes a valve lift characteristic control means for variable control of the lift characteristics of intake and exhaust valves for an internal-combustion engine and a deceleration intake control means for controlling the quantity of intake air to be supplied to the downstream side of the intake throttle valve during the decelerating operation of the engine, comprises an intake control characteristic change means for changing the control characteristics of the deceleration intake control means in response to the valve lift characteristic control.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 10A and 10B are explanatory views of one example of $I_{DEC}$ tables for manual-transmission and automatic-transmission vehicles, respectively, also showing deceleration $P_{BA}$ characteristics.

DESCRIPTION OF THE PREFERRED EMBODIMENT

Hereinafter an exemplary embodiment of an intake air flow control apparatus for internal-combustion engine according to the present invention will be described by referring to the accompanying drawings.

Figure 1:
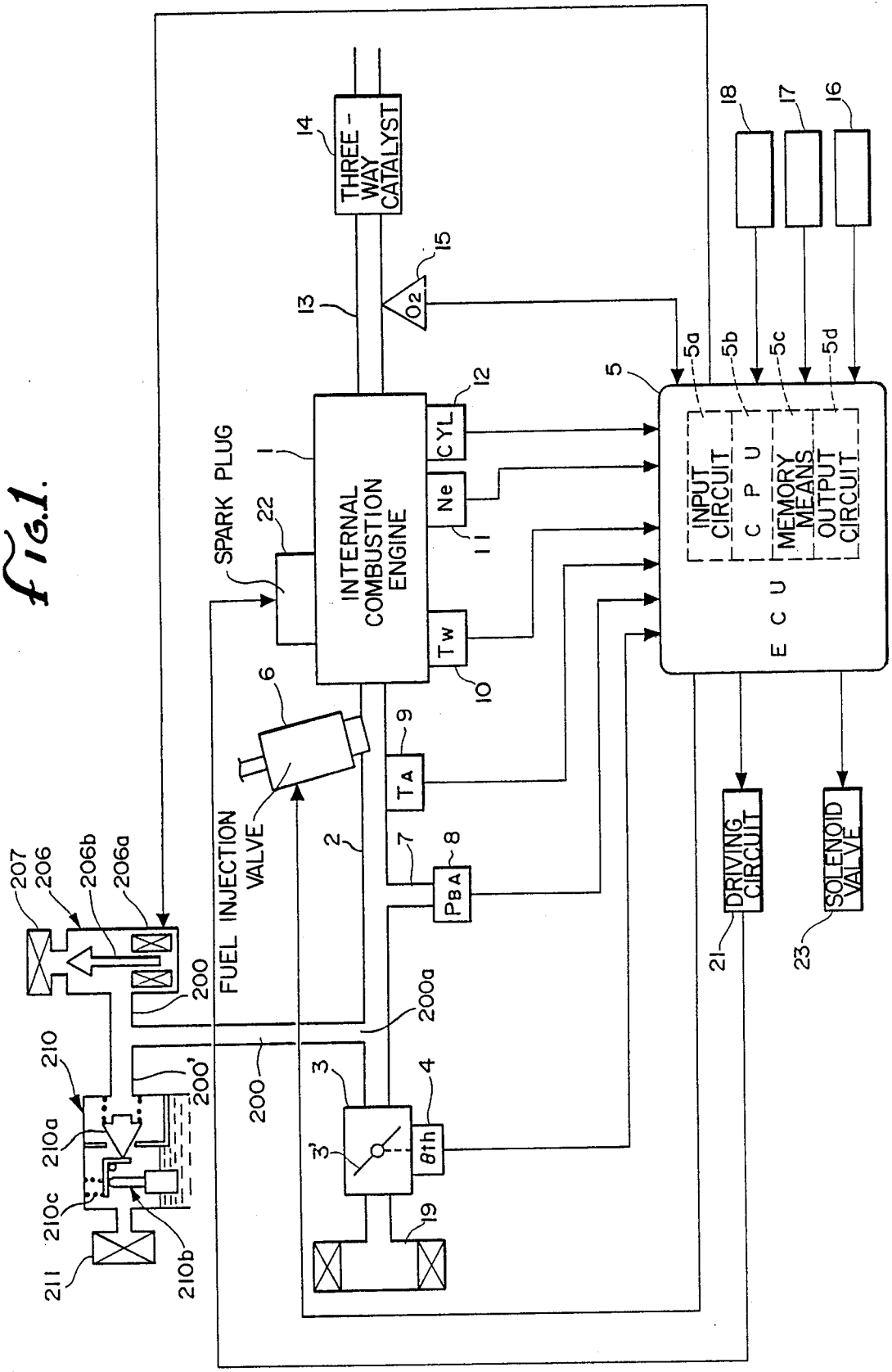
FIG. 1 is a general block diagram of an intake air flow control apparatus showing one embodiment of the present invention.

FIG. 1 is a general block diagram of the intake air flow control apparatus according to the preferred embodiment of the present invention. In this drawing, numeral 1 denotes a straight four-cylinder DOHC internal-combustion engine having an intake valve and an exhaust valve in each cylinder.

To the engine 1 are connected an intake pipe 2 mounted with an air cleaner 19 at the open end and an exhaust pipe 13. In the intake pipe 2 of the engine 1 is provided a throttle body 3, in which a throttle valve 3' is disposed. To this throttle valve 3' a throttle valve opening (0th) sensor 4 is connected and outputs an electrical signal corresponding to the amount of opening of the throttle valve 3' to an electronic control unit (hereinafter termed "ECU") 5.

In this embodiment, a first auxiliary intake air passage 200 opening to the atmosphere is connected to the intake pipe 2 at the downstream side of the throttle valve 3', and an air cleaner 207 is mounted at the open end of the auxiliary intake air passage 200 on the atmosphere side. In this auxiliary intake air passage 200 is disposed an auxiliary intake air flow control valve 206 (hereinafter called only the "AIC valve"). This AIC valve 206 constitutes the intake air flow control means which, cooperating with ECU 5, controls the engine idle speed and the absolute pressure in the intake pipe during deceleration described later on. The amount of opening of this valve (the area of the opening of the passage 200) is controlled by the driving current from ECU 5. In the illustrated example, a so-called linear solenoid valve is used as the AIC valve 206, which consists of a solenoid 206a in connection with ECU 5 and a valve 206b which opens the first auxiliary intake air passage 200 by the amount of opening (valve lift) according to the driving current while the solenoid 206a is energized.

In FIG. 1, a second auxiliary intake air passage 200' is branched off at the halfway point of the first auxiliary intake air passage 200 downstream of the AIC valve 206. At the opening end on the atmosphere side of the second auxiliary intake air passage 200' is installed the air cleaner 211. Furthermore, in the second auxiliary intake air passage 200' is disposed a fast idle control valve 210 which controls the amount of auxiliary intake air to be supplied to the engine. This fast idle control valve 210 is designed to open when the engine temperature is below a specific set temperature value (e.g., 55° C.), or when the engine is cold-started, and basically consists of a water temperature sensing means 210b comprising wax pellets for displacing the valve body 210a towards closing (to the left in FIG. 1) when the engine water temperature is high, and a pressing means 210c for pressing the valve body 210a constantly toward opening the valve (to the right in FIG. 1) against the water temperature sensing means 210b.

In the intake pipe 2 between the engine 1 and the opening 200a of the first auxiliary intake air passage 200 is provided a fuel injection valve 6.

The fuel injection valve 6 is provided for each cylinder a little upstream of the intake valve, each injection valve being connected to a fuel pump not shown and in electrical connection with ECU 5, such that the length of time the fuel injection valve is opened can be controlled by a signal from ECU 5.

A spark plug 22 provided in each cylinder of the engine I is connected to ECU 5 via a driving circuit 21; the ignition timing (Big) of the spark plug 22 is controlled by ECU 5. timing On the output side of ECU 5 is connected a solenoid valve 23 for controlling the change of the valve timing described below. The opening and closing operation of this solenoid valve 23 is controlled by ECU 5.

In the meantime, an absolute pressure (PBA) sensor 8 for sensing the absolute pressure in the intake pipe is provided through a pipe 7 immediately downstream of the throttle valve 3. An absolute pressure signal converted into an electrical signal by this absolute pressure sensor 8 is fed to ECU 5. Also, at the downstream side thereof is mounted an intake air temperature (TA) sensor 9, which detects an intake air temperature TA and outputs an electrical signal to ECU 5.

An engine water temperature sensor (Tw) 10 mounted in the engine 1 is constituted of a thermistor and others. It detects the engine water temperature (cooling water temperature) Tw, and then sends a corresponding temperature signal to ECU 5. An engine speed (Ne) sensor 11 and a cylinder discriminating (CYL) sensor 12 are mounted adjacent a camshaft or a crankshaft of the engine 1. The engine speed sensor 11 produces a pulse (hereinafter called the "TDC signal pulse") at a specific crank angle position every 180 degrees of rotation of the crankshaft of the engine, while the CYL sensor 12 outputs a signal pulse at a specific crank angle position of a specific cylinder. Each signal pulse thus produced from these sensors is supplied to ECU 5.

A three-way catalyst 14 is disposed in the exhaust pipe 13 of the engine 1 for the reduction of three components such as HC, CO and NOx in exhaust gases. An $O_2$ sensor 15 as an exhaust gas concentration detector is mounted on the upstream side of the three-way catalyst 14 in the exhaust pipe 13, functioning to detect oxygen concentration in the exhaust gases and produce a signal according to a value of the oxygen concentration thus detected, to ECU 5.

To ECU 5 are further connected a vehicle speed sensor 16, a gear position sensor 17 which detects the shift position of a transmission, and an oil pressure sensor 18 which detects an oil pressure within an oil supply path (88i and 88e of FIG. 2) of the engine 1 described later. Detection signals from these sensors are supplied to ECU 5.

ECU 5 is composed of an input circuit 5a having functions to shape the waveform of an input signal coming from the sensors, to correct a voltage level to a specific level, and to convert an analog signal value into a digital one; a central processing unit (hereinafter called "CPU") 5b; a memory means 5c which stores various operation programs to be executed at CPU 5b, and results of operations; and an output circuit 5d which supplies driving signals to the fuel injection valve 6, the driving circuit 21, the solenoid valve 23, and an AIC control valve 206.

CPU 5b functions to discriminate various engine operating conditions within a feedback control operation range and an open-loop control operation range corresponding to oxygen concentration on the basis of various engine parameter signals stated above, and also to compute a fuel injection time TOUT of the fuel injection valve synchronizing with the TDC signal pulse previously stated, as follows:

$$T_{OUT} = T_i \times K_{WOT} \times K_1 K_2 \quad (1)$$

where Ti is the basic quantity of fuel, expressed as a basic fuel injection time to be determined by the engine speed Ne and the absolute pressure PBA in the intake pipe. The Ti maps for determining this Ti value, namely, two maps including (TiL map) for low-speed valve timing and (Ti$_H$ map) for high-speed valve timing, are stored in a memory means 5c.

$K_{WOT}$ denotes a high-load fuel enrichment coefficient for increasing the quantity of fuel in a specific high-load range.

$K_1$ and $K_2$ are other correction coefficients and correction variables to be computed in accordance with various engine parameter signals. These values are determined at specific values for optimization of such characteristics as fuel consumption and engine acceleration according to engine operating conditions.

CPU 5b further functions to determine the ignition timing 0ig according to the engine speed Ne and the absolute pressure PBA in the intake pipe. The 0ig maps for determining this ignition timing, namely, two maps including (Oig map) for low-speed valve timing and (0ig$^H$ map) for high-speed valve timing, are similarly stored in the memory means 5c as the Ti map mentioned above.

Furthermore, CPU 5b outputs a valve timing change indication signal by a means described below, to control the opening and closing of the solenoid valve 23.

CPU 5b functions also to output, through the output circuit 5d, signals for driving the fuel injection valve 6, the driving circuit 21, and the solenoid valve 23, in accordance with a result determined by the above-described computation.

Furthermore, CPU 5b discriminates engine operating conditions and valve timing conditions on the basis of values of engine operation parameter signals supplied from the throttle valve opening sensor 4, the absolute pressure sensor 8 in the intake pipe, the engine water temperature sensor 10 and the engine speed sensor 11, and as a result of change of the valve timing, computes the amount of auxiliary air to be supplied by the AIC valve 206 in accordance with a control program described later, corresponding to these conditions, that is, the length of time the AIC valve 206 is opened, and supplies a driving signal to operate the AIC valve 206 according to a calculated value via the output circuit 5d. The solenoid 206a of the AIC valve 206 is energized through the length of time the valve is opened, in accordance with the calculated value, and opens the valve 206b to the amount of opening of a surface area corresponding to the valve opening command value $I_{DEC}$ during deceleration when the engine is in a decelerating operation, supplying the auxiliary air to the engine 1 through the first intake air passage 200 and the intake pipe 2.

The intake air flow control by the AIC valve 206 during deceleration changes with any change in the valve timing between low speeds and high speeds. In this embodiment two tables for the low-speed valve timing and the high-speed valve timing are stored as $I_{DEC}$ tables for determining an $I_{DEC}$ value by the memory means 5c. When the quantity of intake air to be supplied downstream of the throttle valve 3' during decelerating operation is determined by the use of the $I_{DEC}$ tables, the $I_{DEC}$ tables in use are changed over simultaneously with the change of the valve timing.

For this change between the high-speed valve timing and the low-speed valve timing, this embodiment adopts a construction which performs this change by selecting rocker arms and cams as described below.

Figure 2:
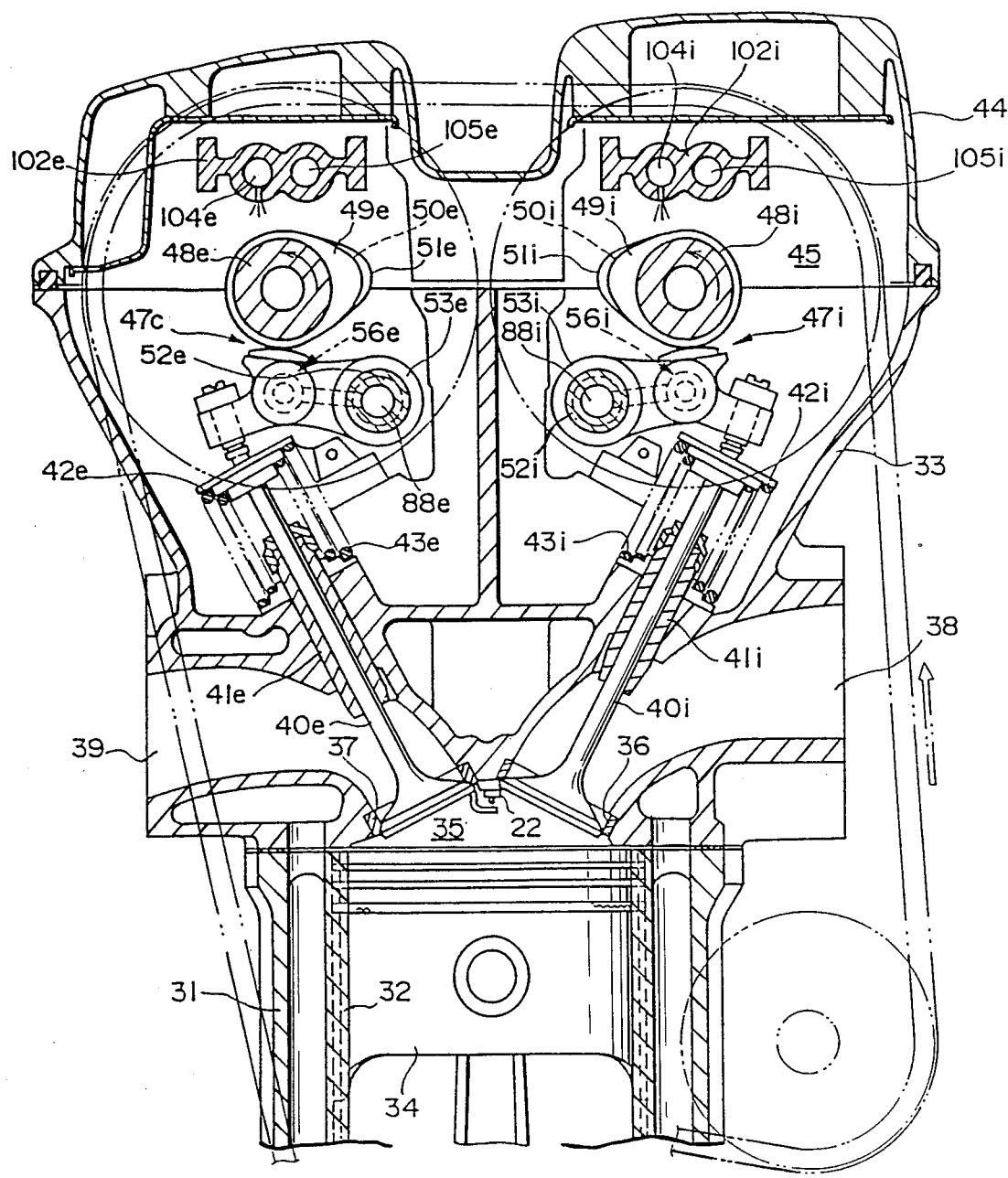
FIG. 2 is a sectional view showing a major section of an engine.

FIG. 2 is a sectional view showing a major section of the engine 1 having four in-line cylinders 32 in a cylinder block 31. Between a cylinder head 33 mounted on the top of the cylinder block 31 and a piston 34 slidably inserted in each of the cylinders 32 is defined a combustion chamber 35. The cylinder head 33 is provided with a pair of intake ports 36 and a pair of exhaust ports in a section forming the ceiling surface of each combustion chamber 35. Each intake port 36 communicates with an intake port 38 open in one side of the cylinder head 33, and each exhaust port 37 communicates with an exhaust port 39 open in the other side of the cylinder head 33.

The cylinder head 33 has guide tubes 41i and 41e fitted and secured in sections corresponding to each cylinder 32, in order to guide a pair of intake valves 40i capable of opening and closing each intake port 36 and a pair of exhaust valves 40e capable of opening and closing each exhaust port 37. From these valve 40e project upwardly. Between collars 42i and 42e installed on the upper end of each intake valve 40i and each exhaust valve 40e and the cylinder head 33 are mounted valve springs 43i and 43e in a compressed state, pressing each intake valve 40i and each exhaust valve 40e upwardly, that is, in a direction the valves are closed.

Between the cylinder head 33 and a head cover 44 attached to the top of the cylinder head 33 is defined a valve operation chamber 45, in which an intake valve operating mechanism 47i for opening and closing the intake valves 40i in each cylinder 32 and an exhaust valve operating mechanism 47e for opening and closing the exhaust valve 40e in each cylinder 32 are housed and arranged. Both the valve operating mechanisms 47i and 47e are basically the same in construction. Hereinbelow the intake valve operating mechanism 47i will be described, using reference numerals added with a character i; the exhaust valve operating mechanism 47e will be merely illustrated with a character e added to the reference numerals.

Figure 3:
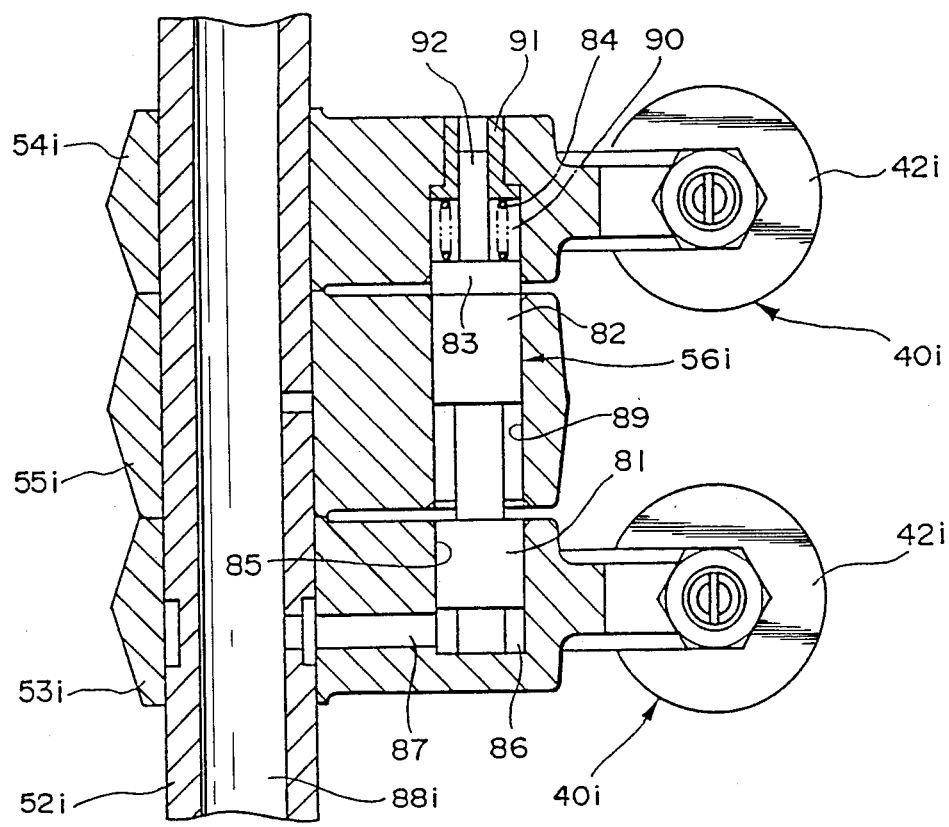
FIG. 3 is a cross sectional view showing a valve timing link changeover mechanism.

As shown in FIGS. 2 and 3, the intake valve operating mechanism 47i includes a camshaft 48i which is rotated at a ½ speed ratio by an engine crankshaft (not shown), a high-speed cam 51i and low-speed cams 49i and 50i (the low-speed cam S0i is nearly the same in shape as the low-speed cam 49i, and positioned on the opposite side of the high-speed cam 51i as the low-speed cam 49i) mounted on the camshaft 48i, corresponding to each cylinder 32, a rocker shaft 52i fixedly arranged in parallel with the camshaft 48i, a first rocker arm 53i, a second rocker arm 54i and a free rocker arm 55i which are pivotally mounted on the rocker shaft 52i corresponding to each cylinder 32, and a valve timing link changeover mechanism 56i provided among the rocker arms 53i, 54i and 55i corresponding to each cylinder 32.

In FIG. 3, the link changeover mechanism 56i has a first changeover pin 81 capable of linkage between the first rocker arm 53i and the free rocker arm 55i, a second changeover pin 82 capable of linkage between the free rocker arm 55i and the a regulating pin 83 which regulates the movement of the first and second changeover pins 81 and 82, and a return spring 84 for pressing each of the pins 81 to 8 towards releasing.

The first rocker arm 53i is provided with a first guide hole 85 which is a bottomed hole opening on the free rocker arm 55i side, drilled in parallel with the rocker shaft 52i. In this first guide hole 85 is slidably inserted the first changeover pin 81, and between one end of the first changeover pin 81 and the closed end of the first guide hole 8 is defined a hydraulic chamber 86. In addition, the first rocker arm 53i has a passage 87 drilled to communicate with the hydraulic chamber 86; and the rocker shaft 52i is provided with an oil supply passage 88i, which always communicates with the hydraulic chamber 86 through the passage 87 notwithstanding the rocking condition of the first rocker arm 53i.

The free rocker arm 55i has a guide hole 89 drilled through between both sides in parallel with the rocker shaft 52i, corresponding to the first guide hole 85; in this guide hole 89 is slidably fitted the second changeover pin 82 which is in contact at one end with the other end of the first changeover pin The second rocker arm 54i is provided with a second guide hole 90 which is a bottomed hole drilled in parallel with the rocker shaft 52i, opening on the free rocker arm 55i side correspondingly to the guide hole 89. In this second guide hole 90 is slidably inserted a disc-like regulating pin 83, which is in contact with the other end of the second changeover pin 82. Furthermore, in the closed end of the second guide hole is fitted a guide tube 91. A shaft section 92 slidably fitted in this guide tube 91 projects coaxially and integrally with the regulating pin 82. The return spring 84 is inserted between the guide tube 91 and the regulating pin 83, pressing each of the pins 81, 82 and 83 toward the hydraulic chamber 86 side.

In the link changeover mechanism 56i, as the hydraulic pressure increases, the first changeover pin 81 moves into the guide hole 89 and the second changeover pin 82 moves into the second guide hole 90, thus connecting the rocker arms 53i, 55i and 54i. Also, as the hydraulic pressure in the hydraulic chamber 86 decreases, the first changeover pin 81 is moved back by the spring force of the return spring 84 as far as a position in which its contact surface in contact with the second changeover pin 82 comes between the first rocker arm 53i and the free rocker arm 55i. At the same time the second changeover pin 82 is moved back by the return spring 84 to a position where its contact surface in contact with the regulating pin 83 comes between the free rocker arm 55i and the second rocker arm 54i, thereby disconnecting each of the rocker arms 53i, 55i and 54i.

Figure 4:
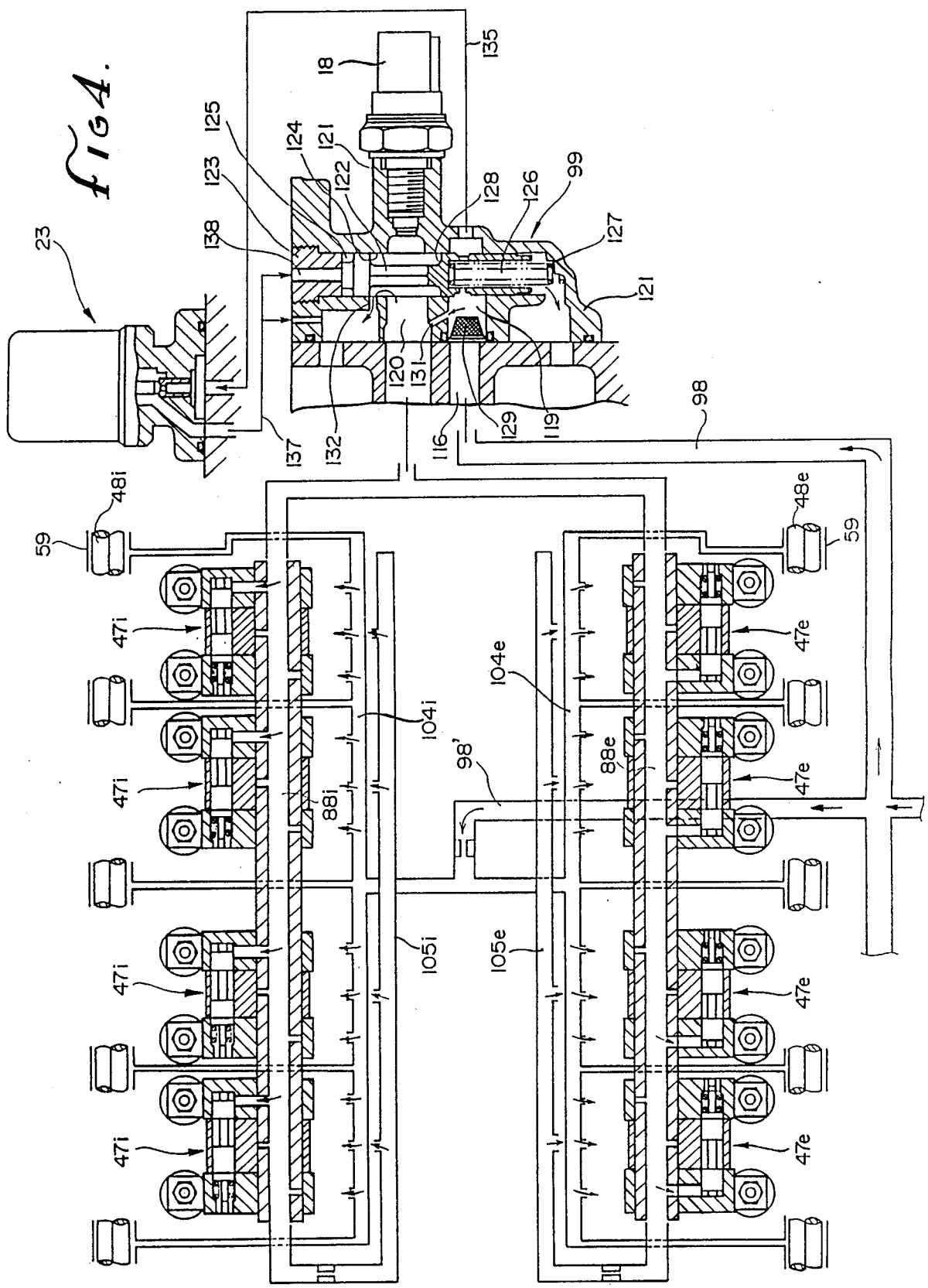
FIG. 4 is a view showing a lubrication system and a hydraulic pressure changeover device.

Subsequently, the lubrication system for supplying the oil to both the valve operating mechanisms 47i and 47e will be explained with reference to FIG. 4. To an oil pump (not shown) for pumping the oil from the oil pan (not shown) is connected oil galleries 98 and 98'. From these oil galleries 98 and 98' the hydraulic pressure is supplied to each of the link changeover mechanisms 56i and 56e and at the same time the lubricating oil is supplied to each part of the valve operating mechanisms 47i and 47e that needs lubrication.

To the oil gallery 98 is connected a changeover valve 99 which changes the hydraulic pressure from a high to a low pressure or vice versa and supplies it to operating parts. The oil supply passages 88i and 88e provided in the rocker shafts 52i and 52e respectively are connected to the oil gallery 98 through the changeover valve 99.

On the top of each cam shaft holder 59, oil passage forming members 102i and 102e extending parallel with both the camshafts 48i and 48e are fastened by a plurality of bolts. The oil passage forming members 102i and 102e have low-speed lubricating oil passages 104i and 104e and high-speed lubricating oil passages 105i and 105e respectively, both closed at both ends and arranged parallelly with each other. The low-speed lubricating oil passages 104i nd 104e are connected to the oil gallery 98 and the high-speed lubricating oil passages 105i and 105e are connected to the oil supply passages 88i and 88e respectively. The low-speed lubricating oil passages 104i and 104e are also connected to the cam holder 59.

The changeover valve 99 has an inlet port 119 communicating with the oil gallery 98, and an outlet port 120 communicating with the oil supply passages 88i and 88e, and a spool valve 122 is slidably fitted in a housing 121 mounted at one end of the cylinder head 3.

The housing 121 is provided with a cylinder bore 124 drilled with its top end closed with the cap 123. A spool valve body 122 forms a hydraulic pressure chamber 125 between the same and the cap 123 and is slidably fitted in the cylinder bore 124. In addition, in a spring chamber 126 formed between the bottom of the housing 121 and the spool valve body 122, there is inserted a spring 127 which pushes the spool valve body 122 upwardly, or in a direction the spool valve closes. The spool valve body 122 has an annular recess 128 capable of communicating between the inlet port 119 and the outlet ports 120, and blocks the passage between the inlet port 119 and the outlet port 120 when the spool valve body 122 is in the up position.

With the housing 121 attached on the end of the cylinder head 3, an oil filter 129 is held between the inlet port 119 and the high-speed hydraulic pressure supply passage 116. The housing 121 is provided with a drilled orifice 131 communicating between the inlet port 119 and the outlet port 120. Therefore, when the spool valve body 122 is in a closed positioned, the inlet port 119 and the outlet port 120 hydraulic pressure reduced by the orifice 131 is supplied from the outlet port 120 to the oil supply passages 88i and 88e.

The housing 121 has also a drilled bypass port 132 which communicates with the outlet port 120 through the annular recess 128 only when the spool valve body 122 is in a closed position. This bypass port 132 communicates with the upper part in the cylinder head 3.

To this housing 121 is connected a pipeline 135 always communicating with the inlet port 119. This pipeline 135 is connected to a pipeline 137 via a solenoid valve 23. The pipeline 137 is connected to a connection hole 138 provided by drilling in the cap 123. Accordingly, when the solenoid valve 23 is operated to open, the hydraulic pressure is supplied to the hydraulic chamber 125, then the spool valve body 122 is moved in a direction to open by the hydraulic pressure introduced into this hydraulic chamber 125.

Furthermore, in this housing 121 is mounted the hydraulic pressure sensor 18 for detecting the hydraulic pressure at the outlet port 120, that is, in the oil supply passages 88i and 88e. This hydraulic pressure sensor 18 functions to detect whether or not the changeover valve 99 is properly operating.

Hereinafter the operation of the valve operating mechanisms 47i and 47e of the engine 1 will be explained. Since these valve operating mechanisms 47i and 47e operate similarly, only the operation of the intake valve operating mechanism 47i will be explained.

When a VALVE-OPEN command signal is outputted from ECU 5 to the solenoid valve 23, the solenoid valve 23 is operated to open and accordingly the changeover valve 99 is opened, thus increasing the hydraulic pressure in the oil supply passage 88i. Consequently, the link changeover mechanism 56i is operated to connect the rocker arms 53i, 54i and 55i, which are therefore operated as one body by the high-speed cam 51i, thereby opening and closing a pair of intake valves 40i at a high-speed valve timing of a relatively longer valve-opening period and a relatively larger valve lift.

When a VALVE-CLOSE command signal is produced from ECU 5 to the solenoid valve 23, the solenoid valve 23 and the changeover valve 99 are closed, decreasing the oil pressure in the oil supply passage 88i. In consequence, the link changeover mechanism 56i operates reversely to the above-described, thus disconnecting the rocker arms 53i, 54i and 55i. The rocker arms 53i and 54i are therefore operated by the low-speed cams 49i and 50i respectively, thereby actuating a pair of intake valves 40i at a low-speed valve timing of a relatively shorter valve-opening period and a relatively smaller valve lift.

Next, the valve timing changeover control will be described in detail.

Figure 5:
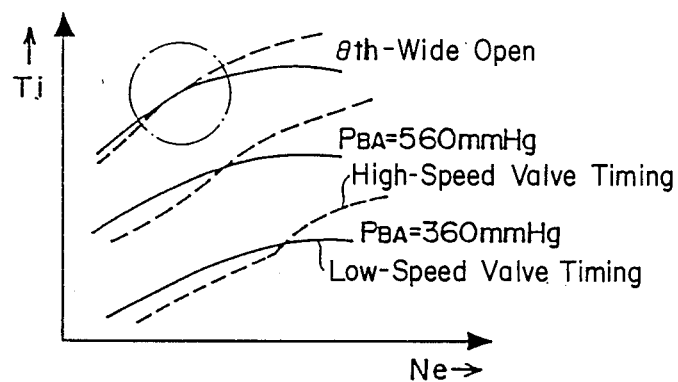
FIG. 5 is a view showing basic fuel quantity setting characteristics for low-speed valve timing and high-speed valve timing.

In FIG. 5, a full line indicates a Ti value of a $Ti_L$ map for the low-speed valve timing, and a dotted line represents a Ti value of a TiN map for the high-speed valve timing. As is clear from this drawing, the rate of increase in the quantity of intake air decreases with an increase in the engine speed Ne at the low-speed valve timing. Also, at the high-speed valve timing, the charging efficiency increases as the engine speed Ne rises, resulting in an increased quantity of intake air over that at the low-speed valve timing. Therefore, the Ti value for the low-speed valve timing and the Ti value for the high-speed valve timing agree in the course of engine speed-up. In this state, since the quantity of intake air is equal and the air-fuel ratio is the same at either of the low-speed and high-speed valve timings, the engine power will become nearly the same.

Figure 6:
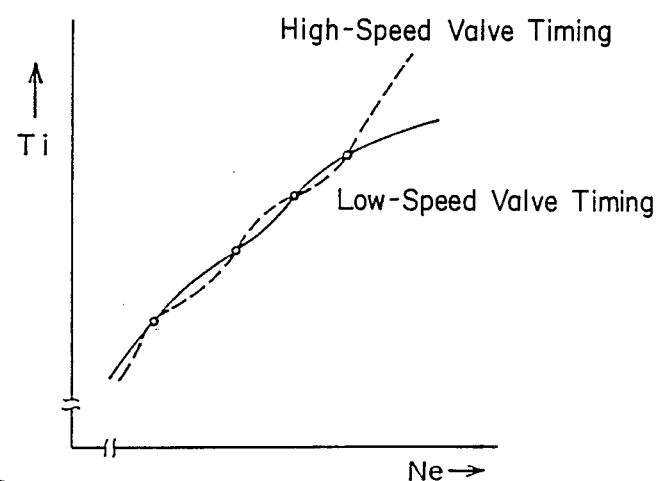
FIG. 6 is an enlarged view of a section circled in FIG. 5.

The charging efficiency makes a subtle variation with the change of Ne. This variation becomes remarkable as the throttle opening 8th approaches a wide-open position. FIG. 6 is an enlarged view of this state, in which the Ti value for the low-speed valve timing and the Ti value for the high-speed valve timing coincide with each other at a plurality of points; when the valve timing is changed at these points the Ti values for the low- and high-speed valve timings agree, a valve timing changeover hunting is likely to occur in a high throttle opening range, giving an adverse effect to the durability of the link changeover mechanisms 56i and 56e.

Figure 7:
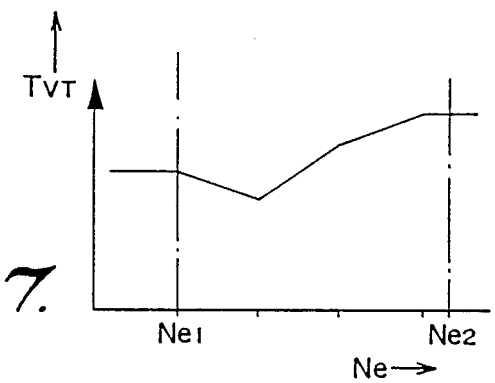
FIG. 7 is a view showing a $T_{vt}$ table.

In the high-load range (0th wide-open range), the air-fuel mixture is enriched by a high-load enrichment coefficient $K_{WOT}$. Because, in such a high-load range, the engine power can be increased by changing to the high-speed valve timing, the high-load decision value $T_{vt}$ based on the quantity of fuel injected is determined experimentally as shown in FIG. 7 when the engine is running in a high-load range (0th wide-open range) and a value of $T_{vt}$ according to Ne is calculated from a T table. When TOUT has exceeded $T_{vt}$, the valve timing is changed over to the high-speed valve timing. In this case, the valve timing changeover hunting can be prevented by including, in the range of $T_{out} \geq T_{vt}$, a range in which the Ti values of the low- and high-speed valve timings in the range of high-throttle opening agree. Different $T_{vt}$ tables are used between automatic-transmission vehicles and manual-transmission vehicles.

The supply of fuel is shut off when Ne has exceeded a rev-limiter value NHFC to prevent engine overrun. When a load acting on the timing belt is taken into consideration, the more the valve-opening time decreases, the more the acceleration during valve opening operation increases and accordingly a greater load will be exerted to the timing belt. Also, with an increase in the acceleration, Ne likely to cause a valve jump will decrease. Therefore, a permissible engine speed becomes different between the low-speed valve timing for a short valve-opening period and the high-speed valve timing for a long valve-opening period. In this embodiment, the rev-limiter value is set at a relatively low value NHFCI (e.g., 7500 rpm) for the low-speed valve timing and at a relatively high value $N_{HFC2}$ (e.g., 8100 rpm) for the high-speed valve timing.

Figure 8:
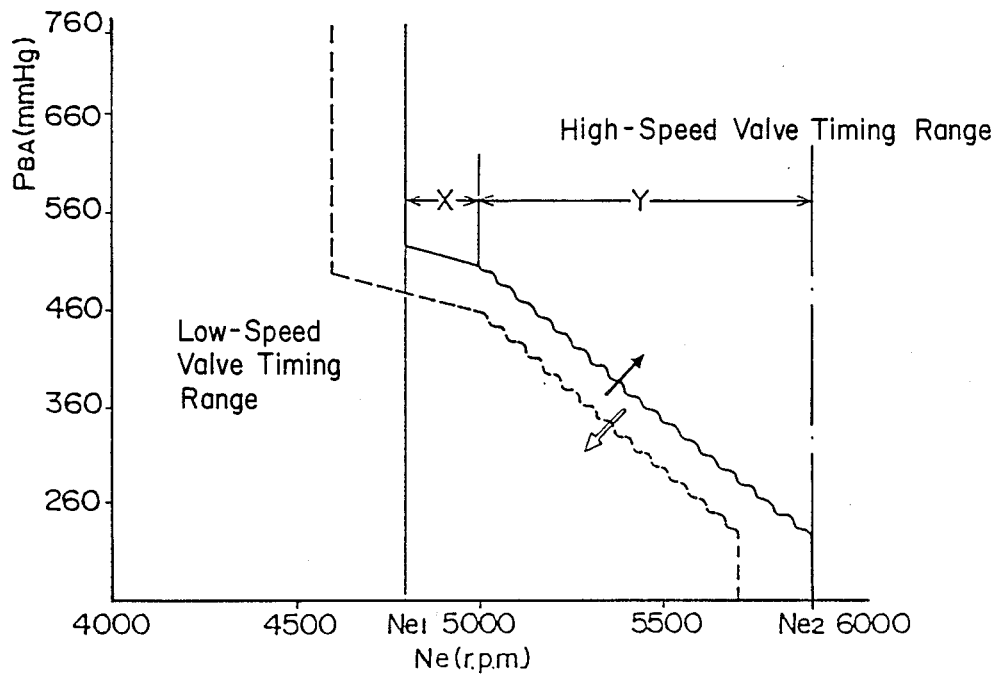
FIG. 8 is a view showing the changeover characteristics of the valve timing.

Next, the valve timing changeover characteristics will be explained with reference to FIG. 8. In this drawing, the full line indicates the low-speed valve timing-to-high-speed valve timing changeover characteristics, and the dotted line, reverse changeover characteristics thereof.

The changeover of the valve timing is effected within a range between the lower-limit speed Ne at which the engine power obtainable at the low-speed valve timing is constantly in excess of the engine power obtainable at the high-speed valve timing and the upper-limit speed Ne2 at which the engine power obtainable at the high-speed valve timing is constantly in excess of the engine power obtainable at the low-speed valve timing. In this embodiment, a hysteresis is provided between a changeover from the low-speed valve timing to the high-speed valve timing and vice versa, setting Ned at for example 4800 rpm/4600 rpm, and Ne2 at for example 5900 rpm/5700 rpm.

In the drawing, the range X is a range within which the valve timing is changed by comparing TOUT with TinT when the engine is operating in a high-load range (0th wide-open range), and the range Y indicates a range within which the valve timing is changed by comparing the $Ti_L$ map for the low-speed valve timing with the $Ti_H$ value for the high-speed valve timing. Since the changeover characteristics in the range X are subject to influences of other parameters than Ne and $P_{BA}$ necessary for the computation of $T_{out}$, FIG. 8 in which Ne and are plotted on the horizontal and vertical axes is not enough to accurately indicate the changeover characteristics; the changeover characteristics of the range X are to be used for convenience's sake.

In this embodiment, as described above, the high-speed cams 51i and 51e and low-speed cams 49i, 49e, 50i and 50e are employed for the control of the lift characteristics of the intake valve 40i and the exhaust valve 40e. In the low-speed range the low-speed cams 49i, 49e, 50i and 50e open and close the valves, and in the high-speed range the high-speed cams 51i and 51e are used to open and close the valves, so that a high power can be taken out throughout a wide range of engine speeds from low to high. Selective changes of these cams can be effected by ECU 5 in accordance with operating conditions.

Next, the intake air flow control during engine deceleration (intake air flow control by a deceleration pressure control mode) including a change processing for the changeover of the IDEC valve simultaneously with the changeover of the valve timing described above will be explained by referring to FIG. 9.

Figure 9:
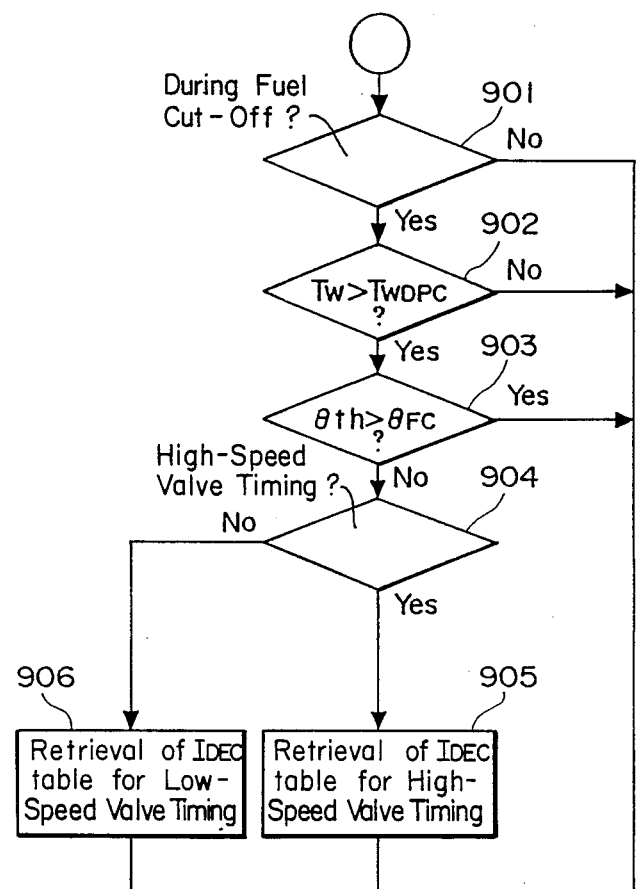
FIG. 9 is a program flowchart for the execution of the intake air flow control during deceleration.

FIG. 9 shows a program flowchart of intake air flow control during engine deceleration by the AIC valve 206 which is executed by CPU 5b in FIG. 5.

This program is executed simultaneously with the production of each TDC signal pulse.

First, at Step 901, discrimination is made to see whether or not during fuel cut-off when the engine is decelerating. This discrimination is effected by checking whether or not for example the absolute pressure $P_{BA}$ in the intake pipe is below a specific discriminating value preset at a greater value with an increase in the engine speed. When an answer at Step 901 is NO, that is, when the fuel is being supplied to the engine, the execution of the intake air flow control by the deceleration pressure control mode is judged to be unnecessary, and therefore this program may be ended at this point. When the answer is YES at this Step 901, the program is proceeded to Step 902. At Step 902, it is judged whether or not the engine cooling water temperature Tw is higher than a specific value $T_{WDPC}$ (e g., 60° C.). If the answer is NO, the engine temperature is low and the fast idle control valve 210 described previously is in operation; and accordingly it is judged that no oil will work up into the combustion area. The program, therefore, will be finished at this point. When the answer is YES at Step 902, it is necessary to judge whether or not the valve opening 0th of the throttle valve 3' is larger than a specific value $O_{FC}$ which substantially indicates the fully-closed and valve opening (Step 903). If the answer is YES, the intake air-flow into the intake pipe 2 through the throttle valve 3', and therefore it is judged that the absolute pressure in the cylinder will not suddenly drop and no intake air control by the deceleraton pressure control mode is needed. When the answer at Step 903 is NO, a discrimination is made to see whether the above-mentioned valve timing agrees with the high-speed valve timing (Step 904).

When the answer is YES at step 904, that is, when the valves are operating at a high-speed valve timing, the $I_{DEC}$ value is determined (Step 905) through the retrieval of the $I_{DEC}$ table for the high-speed valve timing, ending this program. If the answer is NO, that is, in the case of the low-speed valve timing, the $I_{DEC}$ is determined (Step 906) through the retrieval of the $I_{DEC}$ table for the low-speed valve timing, then finishing this program.

FIG. 10A shows one example of the $I_{DEC}$ table for both the high- and low-speed valve timings in comparison with the characteristics of deceleration $P_{BA}$ in the case of a vehicle with a manual transmission (MT).

As shown in the drawing, the valve opening command values $I_{DEC}$ to the AIC valve 206 for either of the high-speed valve timing and the low-speed valve timing are set as a function corresponding to the engine speed Ne in the $I_{DEC}$ table. For example, in the case -of the high-speed valve timing, $I_{DEC}$ is $I_{DEC00}$ (=0) when the engine speed Ne is less than 3000 rpm, that is, the AIC valve 206 is fully closed. However, when the engine speed Ne has exceeded 3000 rpm, four $I_{DEC}$ values, or $I_{DEC30}$, $I_{DEC20}$, $I_{DEC41}$, and $I_{DEC51}$ have been set relative to four specific engine speeds Ne, or 3500 rpm, 4000 rpm, 5000 rpm and 6000 rpm. At the same time, when the engine speed Ne exceeds 6000 rpm, the 1DEC value is gradually increased from $I_{DEC}$ as illustrated.

Here each $I_{DEC}$ value has been set in the relation of $I_{DEC20} < I_{DEC30} < I_{DEC41} < I_{DEC51}$.

In the case of the low-speed valve timing also, the $I_{DEC}$ values have been preset relative to the engine speed Ne.

Namely, when the engine speed Ne is below about 2250 rpm, $I_{DEC} = I_{DEC00}$. When, however, the engine speed Ne exceeds about 2250 rpm, four $I_{DEC}$ values, or $I_{DEC31}$, $I_{DEC40}$ $I_{DEC52}$ are preset relative to four specific engine speeds Ne, 3000 rpm, 4250 rpm, 5000 rpm and 6000 rpm. Also, when the engine speed Ne exceeds 6000 pm, the IDEC value will be gradually decreased from $I_{DEC52}$ as illustrated.

Here, each $I_{DEC}$ value is preset relative to $I_{DEC31} < I_{DEC40} < I_{DEC52}$. Also for the $I_{DEC}$ value for the high-speed valve timing previously stated, the engine speed Ne is preset at a greater value within a range slightly higher than 6000 rpm. In the meantime, when the engine is running on a high-speed range exceeding 6000 rpm, the $I_{DEC}$ value for the low-speed valve timing is preset so as to be a small value as compared with that for the high-speed valve timing.

As described above, two types of tables are provided as 1DEC tables for use in relation to the high- and low-speed valve timings. Either table is selected according to a result of discrimination at Step 904, and the retrieval and decision of the valve opening command value $I_{DEC}$ of the AIC valve 206 during engine acceleration based on the $I_{DEC}$ table selected, correspondingly to the engine speed Ne at the point of time.

Since the intake air flow during deceleration can be changed in response to the valve timing as described above, the intake air flow control can be performed to increase the absolute pressure $P_{BA}$ in the intake pipe during decelerating operation, and accordingly even when the engine pump efficiency varies relative to the valve timing, the control suitable to each valve timing can be effected corresponding to this variation.

Generally, inasmuch as the pumping efficiency is raised on the low engine speed side in the case of the low-speed valve timing and on the high engine speed side in the case of the high-speed valve timing, the valve opening command value for $I_{DEC}$ maintaining a nearly constant absolute pressure $P_{SBA}$ in the intake pipe during deceleration varies with each valve timing. In this embodiment, however, the 1DEC tables to be used simultaneously with the change of the valve timing to that for a related valve timing. Therefore, even in the case of a vehicle mounted with a variable valve timing mechanism, the control of sufficient intake air flow becomes possible to perform, thereby preventing the oil from getting into the combustion area during deceleration and exactly preventing the oil consumption from increasing.

FIG. 10A shows an example of setting of the $I_{DEC}$ value for manual-transmission vehicles. When the intake air flow control characteristics during deceleration requires a change in response to each valve timing, different control characteristics may be prepared for both the manual-transmission and automatic-transmission vehicles and may be selected in accordance with the type of a transmission provided.

Figure 10B:
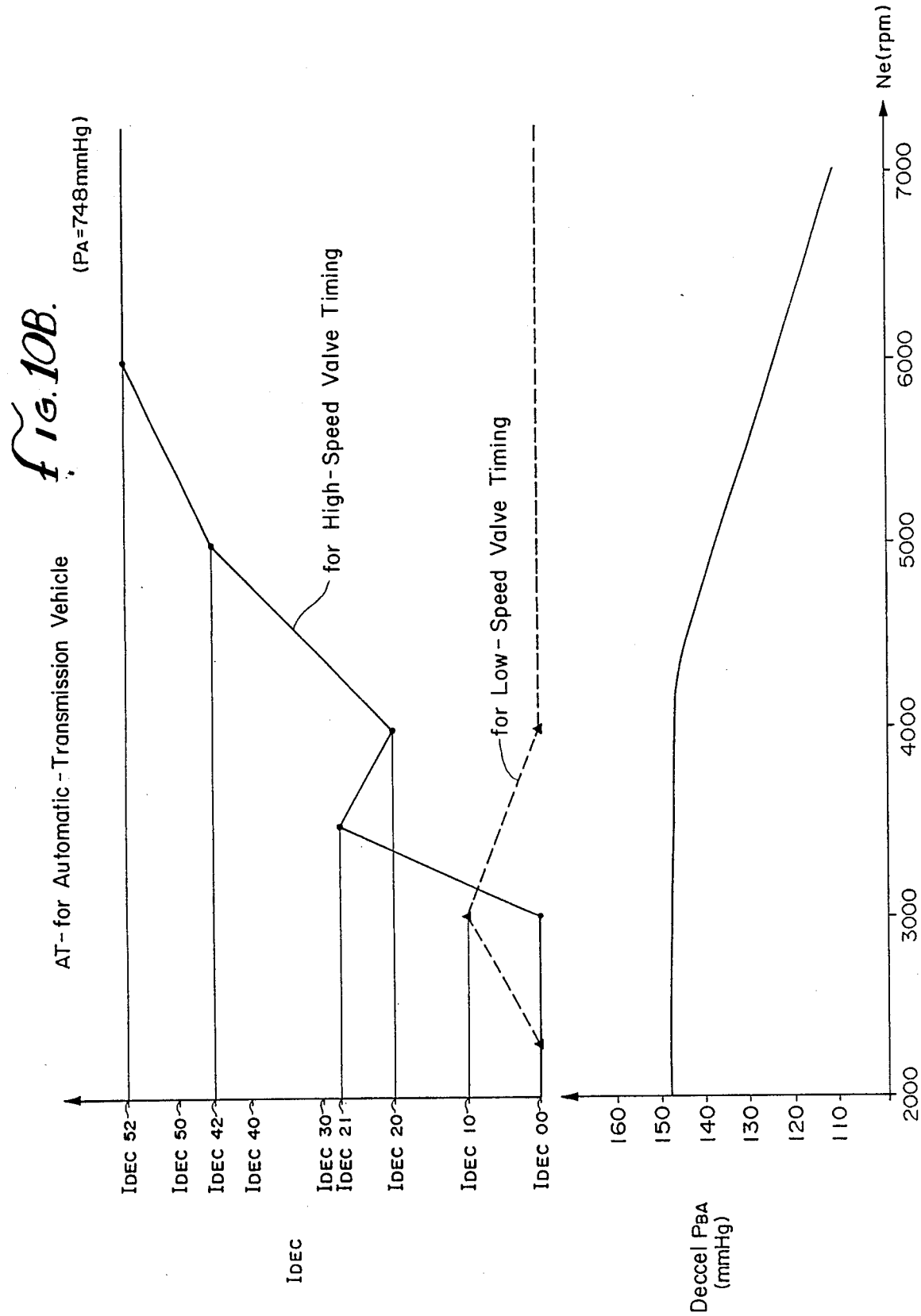

FIG. 10B is a drawing for automatic-transmission vehicles, showing the same example of setting as in FIG. 10(A). Like the $I_{DEC}$ table for the manual-transmission vehicles, there are two types of valve opening command value $I_{DEC}$ tables for the high-speed valve timing and for the low-speed valve timing. The $I_{DEC}$ value is preset as a function of the engine speed Ne to obtain a controlled intake air flow corresponding to the engine speed Ne. Also, on the high engine speed side, IDEC for the low-speed valve timing is set smaller than that for the high-speed valve timing.

Specifically, in the illustrated example for the -high-speed valve timing, $I_{DEC}$ is set at a constant value of $I_{DEC00}$ when the engine is running at a speed Ne below 3000 rpm, and at a - constant value of $I_{DEC52}$ when the engine speed Ne is above 6000 rpm. For engine speeds Ne between the above-mentioned engine speeds, $I_{DEC21}$, $I_{DEC20}$ and $I_{DEC42}$ ($I_{DEC20} < I_{DEC21} < I_{DEC42}$) are set for 3500 rpm, 4000 rpm and 5000 rpm respectively. In the case of the low-speed valve timing, when the engine speed Ne is below about 2250 rpm and above 4000 rpm, $I_{DEC}$ is set at a constant value of $I_{DEC00}$. Also when the engine is running at a speed Ne of 3000 rpm, When the actual engine speed Ne is other than the above-mentioned specific values, the $I_{DEC}$ value can be determined by interpolative computation as in the case of the manual-transmission vehicles shown in FIG. 10A.

When two sets of $I_{DEC}$ tables for the manual- and automatic-transmission vehicles are provided in the memory means 5c, a step is added to the control program in order to discriminate whether the vehicle provided with the engine is a manual-transmission vehicle or an automatic-transmission vehicle, and either of the $I_{DEC}$ table for the manual-transmission vehicle the $I_{DEC}$ table for the automatic-transmission vehicle can be selected. In this case, when the vehicle is provided with variable valve timings, the $I_{DEC}$ value can be properly controlled to change correspondingly to each valve timing previously established, according to the type of vehicle, that is, a manual-transmission or an automatic-transmission vehicle.

According to this embodiment, in the control of the intake valve and/or exhaust valve lift characteristics (inclusive of valve timing and lift), the high-speed valve timing and the low-speed valve timing are changed over by selecting rocker arms and cams, but it should be understood that the present invention is not limited thereto and that the valve timings may be changed by a means for shifting the relative position of the timing belt to the camshaft, and also by a means for stopping one of two valves when each cylinder is provided with a pair of intake valves and a pair of exhaust valves as described above.

The changeover operation for the control of change of the $I_{DEC}$ value is performed by means of the solenoid valve 23.

The $I_{DEC}$ may be changed by changing the actual hydraulic pressure by means of a hydraulic pressure switch provided in a hydraulic pressure passage, or by detecting the actual position of pins (81-83) for valve changeover.

Furthermore, in this embodiment, the $I_{DEC}$ table is changed over simultaneously with the change of the valve timing, but the changeover means should not be limited only to the means described above, and there may be adopted a corrective means for correcting for example the amount of shift of the valve lift.

Furthermore, the concept of this art is applicable to for example the prevention of over-enrichment during deceleration as has been disclosed by the present applicant in Japanese Patent Application No. 61-162812 in addition to the application to a technology for controlling engine load during deceleration.

The intake air flow control device according to this invention, which is usable with an engine including a valve lift characteristic control means for variable control of lift characteristics of intake valves or exhaust valves of an internal-combustion engine and a -deceleration intake control means for controlling the quantity of intake air to be supplied at the downstream side of an intake throttle valve during the decelerating operation of the internal-combustion engine, comprises an intake control characteristic change means for changing control characteristics of the deceleration intake control means in response to the valve lift characteristic control. Therefore, even when the variable control of the intake and exhaust valve lift characteristics is to be effected, a proper intake air flow during deceleration can be set corresponding to the change of the valve lift characteristics, thereby preventing an increase in oil consumption likely to be caused by the rise of oil into the combustion area.

While only certain embodiments of the present invention have been described, it will be apparent to those skilled in the art that various changes and modifications may be made therein without departing from the spirit and scope of the present invention as claimed.

What is claimed is:

1. An intake air flow control apparatus for an internal-combustion engine including a valve lift characteristic control means for variable control of lift characteristics of an intake valve or an exhaust valve of an internal-combustion engine, and a deceleration intake control means for controlling the quantity of intake air to be supplied at the downstream side of an intake throttle valve during the decelerating operation of said internal-combustion engine, said intake air flow control apparatus comprising: an intake control characteristic change means for changing control characteristics of said deceleration intake control means in response to said valve lift characteristic control.

2. An intake air flow control apparatus for an internal-combustion engine as claimed in claim 1, wherein the quantity of intake air to be controlled is set by said deceleration intake control means according to engine speeds.

3. An intake air flow control apparatus for an internal-combustion engine as claimed in claim 2, wherein, on the high-speed side, said intake control characteristic change means sets a less valve lift characteristics for low speed than for high speed.

* * * * *